(12) United States Patent
Heisrath et al.

(10) Patent No.: US 11,989,302 B2
(45) Date of Patent: May 21, 2024

(54) METHOD AND APPARATUS TO ADJUST SYSTEM SECURITY POLICIES BASED ON SYSTEM STATE

(71) Applicant: NXP B.V., Eindhoven (NL)

(72) Inventors: Sören Heisrath, Kaltenkirchen (DE); Fabrice Poulard, Houilles (FR); Marius Rotaru, Haar (DE)

(*) Notice: Subject to any disclaimer, the term of this patent is extended or adjusted under 35 U.S.C. 154(b) by 188 days.

(21) Appl. No.: 17/341,627

(22) Filed: Jun. 8, 2021

(65) Prior Publication Data
US 2021/0406381 A1 Dec. 30, 2021

(30) Foreign Application Priority Data
Jun. 30, 2020 (EP) .................................... 20305728

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

| | | | |
|---|---|---|---|
| 7,725,703 B2 | 5/2010 | Hunter et al. | |
| 7,802,111 B1* | 9/2010 | Tahan | G06F 21/57 713/193 |
| 8,028,172 B2 | 9/2011 | Hunter et al. | |
| 10,079,681 B1* | 9/2018 | Roth | G06F 21/53 |
| 2003/0154401 A1* | 8/2003 | Hartman | H04L 63/20 726/30 |
| 2006/0075464 A1* | 4/2006 | Golan | G06F 21/604 726/1 |
| 2006/0242150 A1* | 10/2006 | Jogand-Coulomb | G06F 21/10 |
| 2015/0058979 A1* | 2/2015 | Peeters | G06F 21/575 726/22 |
| 2015/0200934 A1* | 7/2015 | Naguib | H04L 9/3247 713/168 |
| 2016/0092115 A1* | 3/2016 | Babu | G06F 13/161 711/165 |

(Continued)

OTHER PUBLICATIONS

AUTOSAR, "Specification of Secure Hardware Extensions," Nov. 28, 2019, 65 pages.

(Continued)

*Primary Examiner* — Wasika Nipa
*Assistant Examiner* — Zhe Liu (57) ABSTRACT

A system, method, and apparatus are provided for securely controlling operations of a data processing system in which security subsystem is activated to provide security services by responding to a security service request, evaluating the request against an adjustable set of system security policies to determine if the security service request is granted access to a protected asset, by generating a response to the security service request using the protected asset if the security service request is granted access to the protected asset, by adjusting a security access policy for the protected asset in the adjustable set of system security policies, and by sending the response from the security subsystem to the external application subsystem.

16 Claims, 5 Drawing Sheets

(56) References Cited

U.S. PATENT DOCUMENTS

| | | | |
|---|---|---|---|
| 2016/0092387 A1* | 3/2016 | Balasubramanian | ........................ G06F 13/404 710/110 |
| 2016/0210457 A1* | 7/2016 | Cleeton | ................. G06F 21/575 |
| 2017/0237747 A1 | 8/2017 | Quinn et al. | |
| 2018/0075262 A1* | 3/2018 | Auh | ........................ G06F 21/78 |
| 2018/0173515 A1* | 6/2018 | Goltz | ........................ G06F 8/65 |
| 2018/0276387 A1 | 9/2018 | Liu et al. | |
| 2019/0042766 A1* | 2/2019 | Pappachan | ............ H04L 9/0819 |
| 2019/0102556 A1 | 4/2019 | Case et al. | |
| 2019/0266331 A1* | 8/2019 | Sanchez Diaz | ......... G06F 21/51 |
| 2019/0294800 A1* | 9/2019 | Andrews | ............... G06F 21/602 |
| 2019/0334702 A1 | 10/2019 | Heisrath | |
| 2020/0159512 A1* | 5/2020 | Schutt | ..................... G06F 21/64 |

OTHER PUBLICATIONS

NXP, "Using the Cryptographic Service Engine (CSE); An introduction to the CSE module," Freescale Semiconductor Application Note, Document No. AN4234, Rev 0, Jun. 2011, 29 pages.

\* cited by examiner

| | Verify | Encrypt | Decrypt | Sign |
|---|---|---|---|---|
| Key 1 | 1 | 1 | 1 | 1 |
| Key 2 | 1 | 0 | 1 | 0 |
| Key 3 | 1 | 1 | 1 | 1 |
| ... | ... | | | |
| Key n | 1 | 0 | 0 | 0 |

TABLE 8A: KEY USAGE POLICY
DURING BOOTLOADER EXECUTION

| | Verify | Encrypt | Decrypt | Sign |
|---|---|---|---|---|
| Key 1 | 1 | 0 | 1 | 0 |
| Key 2 | 0 | 0 | 0 | 0 |
| Key 3 | 1 | 1 | 1 | 1 |
| ... | ... | | | |
| Key n | 1 | 0 | 0 | 0 |

TABLE 8B: KEY USAGE POLICY
AFTER DOWNGRADE

METHOD AND APPARATUS TO ADJUST SYSTEM SECURITY POLICIES BASED ON SYSTEM STATE

BACKGROUND OF THE INVENTION

Field of the Invention

The present disclosure is directed in general to field of data processing. In one aspect, the present disclosure relates to a system for securely activating functionality in a data processing system.

Description of the Related Art

Data processing systems, such as system-on-a-chip (SoC) integrated circuit (IC) systems, are produced with a variety of different configurations, functions, features, and pricing. As the value and use of information processed on such data processing systems continues to increase, individuals and businesses seek additional ways to process and store information. While there are solutions for protecting data integrity in data processing systems, such security solutions typically rely on a hierarchical trust model which requires a sequential initialization of software and hardware during system initialization. In such solutions, the order of execution and initialization corresponds to the level of trust asserted to a given software and/or hardware entity, starting with trusted software and hardware first. Unfortunately, there are numerous design challenges and performance drawbacks associated with conventional security solutions which use security assets, such as keys, to ensure the integrity and authenticity of software and/or hardware operations. First of all, such security assets are typically used for a fraction of a system's run-time (e.g., only during system initialization), so the associated security circuitry and/or operative processing functions are not being efficiently used for such infrequently invoked security operations. And while there are data processing systems which have security subsystems for providing hardware-assisted security relevant services and assets that can be selectively used after an authenticity check of the application firmware (secure boot), such security subsystems typically provide a static security policy that is fixed and unchanging during runtime until the system is powered off or rebooted. As seen from the foregoing, the existing solutions for protecting the integrity of data communications are extremely difficult at a practical level by virtue of the challenges with meeting the performance requirements and cost constraints for securely activating a data processing system functionality that is flexible, yet secure, with low overhead and cost.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for an integrated circuit computer system—such as electronic control units (ECUs), microcontrollers (MCUs), power train control modules (PCM), System(s)-on-a-Chip (SoC), and System(s)-in-a-Package (SiP)—which allows dynamic and secure adjustment of security policies during system runtime that are coherent with the system state and that may be adjusted based on the security status of running software at any given time. In selected embodiments, the integrated circuit computer system includes a security subsystem having control logic, secure memory, and dedicated crypto processor resources which interact with one or more application subsystems that are prevented from directly accessing security assets at the security subsystem. In this way, the security subsystem is connected and configured to ensure the integrity and authenticity of application subsystem operations and/or to provide access to security services to one or more applications subsystems residing outside the scope of the security subsystem. To this end, the security subsystem includes a policy governor that may be implemented in software and/or hardware to provide security functions for adjusting a security policy in response to a request or when a security-related events are triggered by sources internal and external to the integrated circuit computer system. Based upon its configuration, the policy governor is able to dynamically adjust and enforce security policies on the integrated circuit computer system, including securely adjusting (e.g., downscaling) security policies during system runtime (e.g., as part of a software boot or hardware initialization process) to match to the present status of the system. As a result, the system can continue operation after security and/or safety events using a specified fail-operational mode. The system can also obtain improved flexibility on key management for individual customers by allowing firmware encryption keys to be diversified and stored locally in the security subsystem, thereby avoiding the need to have a (shared secret) key in the production environment. As a result, selected embodiments of the present disclosure provide a security subsystem which defines and enforces a system security policy that dynamically matches the present status of the system, and that also enables continued system operation after security and/or safety events by defining limited sanctions in a fail-operational mode. In addition, selected embodiments of the present disclosure provide a security subsystem which enables fast recovery from system standby.

As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. Examples include applications of the techniques described herein in bus communication systems such as serial peripheral interface (SPI) communication interface, communication through an I$^2$C bus system and similar systems. In addition, it will be appreciated that the techniques described herein can be applied to any type of computer network system, including but not limited to computer systems connected in an in-vehicle network (IVN), Controller Area Network (CAN), a Local Interconnect Network (LIN), an Ethernet network, and the like.

Figure 1:
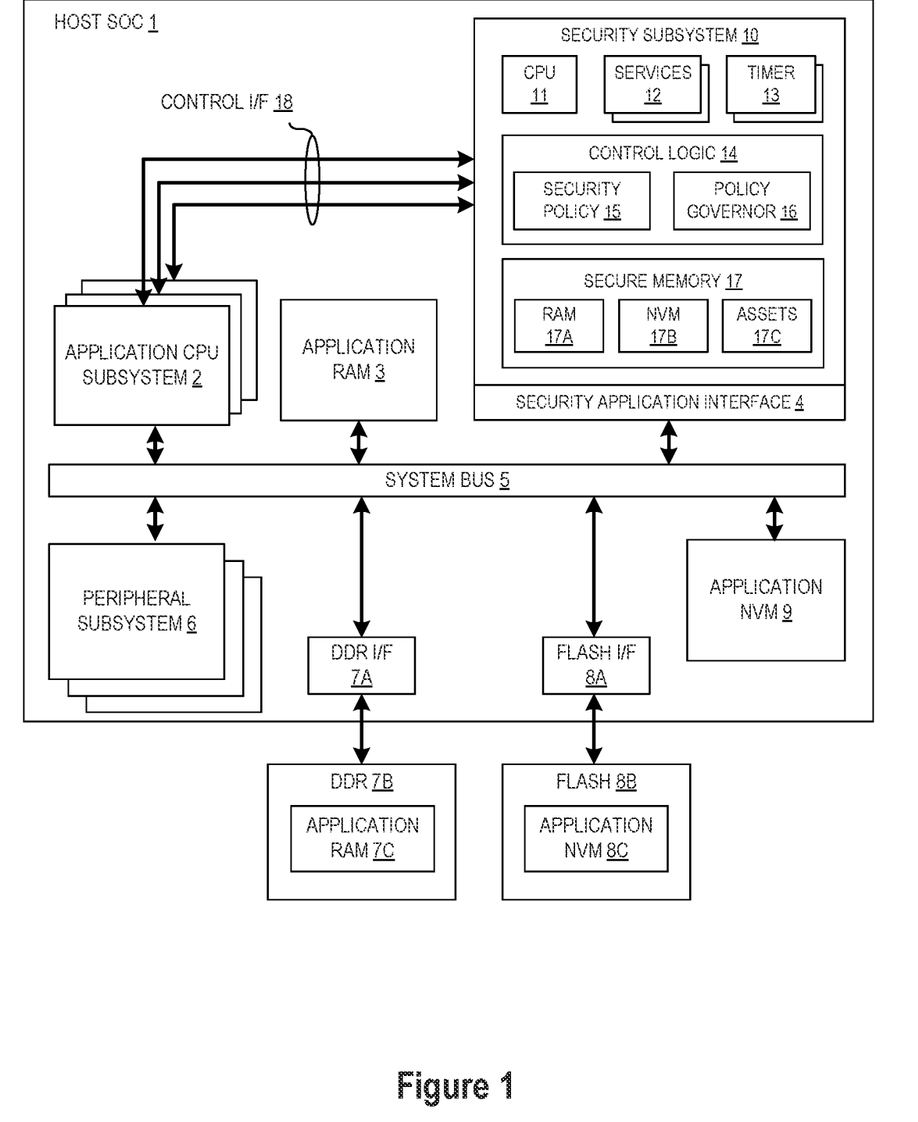
FIG. 1 depicts a simplified top-level system view of a data processing system having a hardware security subsystem which provides a policy governor for adjusting security policies in accordance with selected embodiments of the present disclosure.

To provide additional details for an improved contextual understanding of the present disclosure, reference is now made to FIG. 1 which depicts a simplified top-level system view of a data processing system on a chip (SoC) 1 which includes several accumulated processor functions and resources 2-9 which operate in cooperation with a hardware security subsystem 10 to provide security policies 15 and a policy governor 16 for dynamically adjusting the security policies 15 implemented on the data processing SoC 1. As depicted, data processing SoC 1 includes a communication or system bus 5, one or more application central processing unit (CPU) subsystems 2, application random access memory (RAM) 3, and a security application interface 4 for communicating with the security subsystem 10. In addition, the system bus 5 is connected to one or more peripheral subsystems 6, one or more external memory interfaces, such as DDR interface 7A or flash interface 8A, and an application non-volatile memory (NVM) 9. In turn, the external memory interfaces may be connected to external memory, such as DDR memory 7B (for storing application RAM 7C) or flash memory 8B (for storing application NVM 8C). Each SoC subsystem block is bi-directionally connected to the system bus 5. In one embodiment, the data processing SoC 1 may be implemented as circuitry on a single integrated circuit. In addition, the system bus 5 can be any type of bus structure, including but not limited to an advanced high-performance bus (AHB) or an advanced peripheral bus (APB). In addition, the application CPU subsystem(s) 2 may be any type of processing circuit, including but not limited to a microprocessor (MPU), microcontroller (MCU), digital signal processor (DSP), or another type of processor or processor core. Though not shown, the data processing SoC 1 may include peripheral devices or special-purpose processors used to control peripheral units, such as for example, a direct memory access (DMA) peripheral, communication interfaces, timers, encoders/decoders, etc.

The depicted data processing SoC 1 also includes a security subsystem 10 which is depicted as being embodied as a subsystem within the data processing SoC 1, but which may also be embodied as a standalone microprocessor. However embodied, the security subsystem 10 may be implemented as a deterministic hardware state machine or a composition of software and hardware (e.g., firmware) executing on one or more dedicated CPU cores 11 to implement control logic 14 to govern overall system security by enforcing security policies 15 and a policy governor 16 for dynamically adjusting the security policies 15. To this end, the depicted security subsystem 10 may include security subsystem resources—such as a CPU 11, services 12, timer 13, control logic 14, and secure memory 17—which are configured to ensure the integrity and authenticity of operations of the application CPU subsystem 2 and/or to provide security service functionality 12 to one or more application CPU subsystems 2 which interface with the security subsystem 10 through one or more communication channels, such as the system bus 5, registers or memory (e.g., RAM 3), or a dedicated control interface connection 18. As a subset of its security service functionality 12, the security subsystem 10 may be configured to provide access to security services 12 by an application CPU subsystem 2 residing outside the scope of the security subsystem 10. Such security service may, for example, be a cryptographic operation conducted by a cryptographic engine on an application-provided ciphertext or plaintext and using a cryptographic key.

Another security service functionality provided by the security subsystem 10 is to protect security related assets 17C, such as cryptographic keys used with the security service operation. To this end, the security subsystem 10 may store the key in secure memory 17 which is protected by the security subsystem 10 with an access policy enforced by the policy governor 16. Based on policy decisions at the policy governor 16, the security subsystem 10 may allow or deny a request to use a security service 12 with a cryptographic key stored in secure memory 17.

Another security service functionality provided by the security subsystem 10 is a system control functionality for controlling the application CPU subsystem(s) 2. Examples of system control include the ability reset select application processors 2, to configure and control access to peripherals 6, to configure and control memory access policies, and to reset or pause select application cores at each application CPU subsystem 2. And while each application CPU subsystem 2 that interacts with the security subsystem 10 is prevented from accessing protected assets 17C directly, it may instead use select assets through security services 12 which are provided by the security subsystem 10 and configured to not reveal information on the cryptographic keys and other assets 17C protected by the security subsystem 10.

As described above, the data processing SoC 1 includes an application domain and a security domain. The application domain is implemented by the application CPU subsystem 2 and supporting system resources, including on-chip memory resources (RAM 3, NVM 9), (parts of) security application interface 4, system bus 5, peripheral subsystems 6, and external memory interfaces (e.g., DDR I/F 7A or Flash I/F 8A). In addition, the security domain is implemented by the security subsystem 10 which communicates with the application domain via the security application interface 4 and/or a dedicated interface 18. In selected embodiments, the security subsystem 10 may be a Hardware Security Engine (HSE) subsystem which has its own exclusive system resources 11-17 and connects to the host application CPU subsystem(s) 2 via a dedicated interface 18. In this way, each device subsystem (including the security subsystem 10) may be referred to as system master (or master) which has read and/or write accesses, via the system bus 5, to certain on-chip and off-chip resources, but there are access restrictions which protect security subsystem resources (e.g., secure memory 17) at the security subsystem 10 from being directly accessed by the application CPU subsystem(s) 2.

In operation, application firmware executed by the application CPU subsystem 2 must first be properly authorized before being granted access to services 12 of the security subsystem 10 and/or before being allowed use of cryptographic assets, such as keys stored in the secure memory 17. In other words, the application firmware is verified for authenticity prior to its execution by an application processor using a process commonly referred to as a "secure boot" process which is understood as the process to ensure the integrity and authenticity of one or several application images being executed by one or several application CPU subsystems 2 within the application domain. Accordingly, the security subsystem 10 is the first and only subsystem to start after system reset using startup code that is immutable software to initialize the security subsystem 10 and to run the startup flow. As part of its initialization procedure, the security subsystem 10 may load its configuration and firmware. For protection of the configuration and firmware to be used in the context of the security subsystem 10, firmware and configuration data may be stored in an encrypted form within the security subsystem 10 (e.g., NVM 19) or externally to the security subsystem 10 (e.g., in external flash 8B). To protect the authenticity of firmware and configuration data used within the context of security subsystem 10, firmware and configuration data may further be protected through cryptographic means (e.g., a digital signature, a message authentication tag generated by a message authentication code (MAC) or a block cipher mode of operation). Prior to execution or use by CPU 11, the security subsystem firmware or configuration may be verified, decrypted and stored in RAM 18. In similar fashion, firmware used in the application domain may be stored in an "application image", containing a stream of bytes (an executable) which may be stored in NVM 9 and optionally copied to RAM 3 before being executed by the application CPU subsystem 2 it is associated with.

Figure 2:
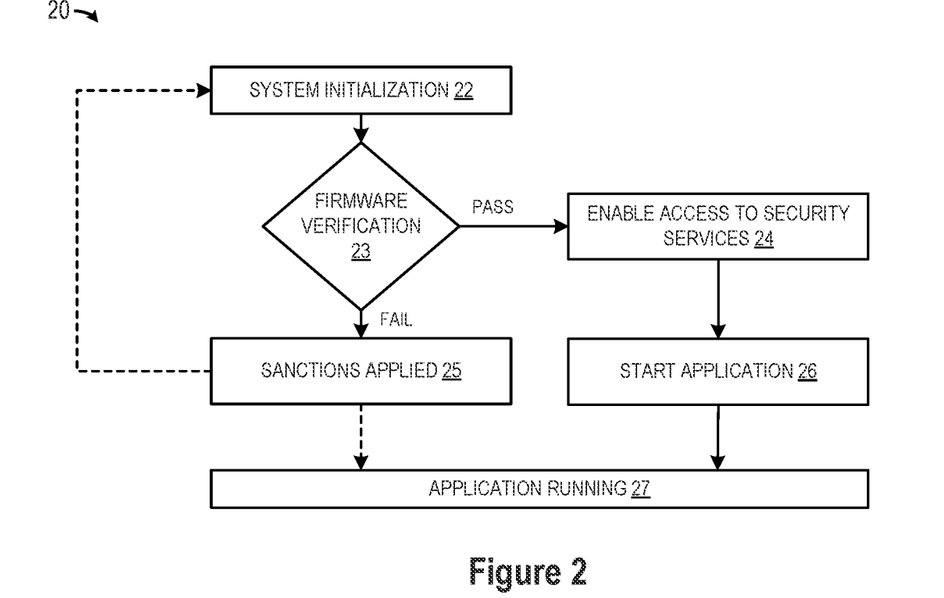
FIG. 2 depicts a simplified flow chart showing an example secure boot procedure.

To illustrate an example secure boot procedure for verifying an application image, reference is now made to FIG. 2 which depicts a simplified flow chart of a boot flow process 20. At step 22, a boot of a data processing system starts at system initialization, such as at power-on or during a reset type of event. At step 23, an application firmware is executed and verified using any suitable to ensure the integrity and authenticity of the application firmware image. For a given application image, the secure boot process executed at step 23 results in a PASS or FAIL response. In case of firmware verification, a PASS response at step 23 allows the application image to be executed by its targeted application CPU subsystem by enabling access to the requested security services (step 24), starting the verified application (step 26), and then running the application (step 27). However, in case the firmware verification fails, a FAIL response at step 23 triggers system level sanctions (step 25). Common sanctions upon failed firmware verification include disabled access to security services or system reset, as indicated with the dashed lines. For example, the boot flow process may return to system initialization or "startup" (step 22) as the phase that initiates after a reset at system (i.e., device) level.

As disclosed herein, the secure boot process 20 may be executed by the security subsystem 10 prior to allowing application CPU subsystems 2 to execute. Transition into application CPU normal operation mode 27 may be controlled through the security subsystem's dedicated control interface 18. System configuration verified by the security subsystem 10 may specify where the application images should be fetched, how they should be verified, and what sanctions should apply in the event of a FAIL response to one or more images. As such, the operative relationship between the security subsystem 10 and application CPU subsystem(s) 2 may be provided in an architecture that allows dynamic adjustment of the otherwise static security policy in accordance with the present disclosure. This architecture resembles an extension to common security architectures described above.

Figure 3:
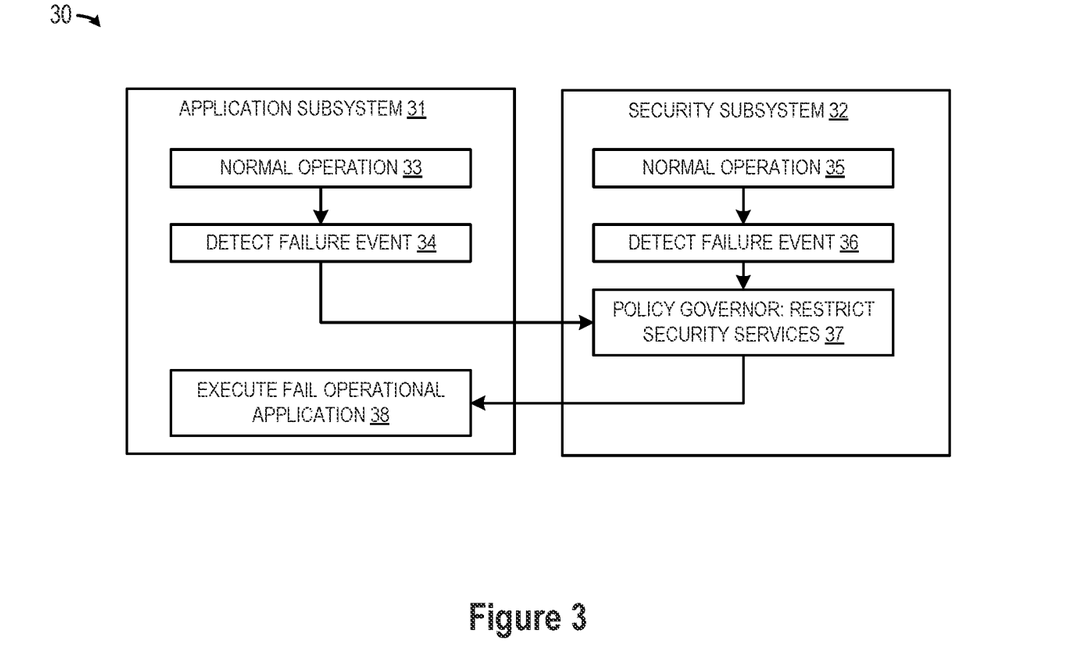
FIG. 3 depicts a simplified block diagram depiction of a hardware security subsystem which transitions to a "fail operational" mode upon detecting a failure event in accordance with selected embodiments of the present disclosure.

To provide additional details for an improved understanding of an example architecture that allows dynamic adjustment of security policies, reference is now made to FIG. 3 which depicts a simplified block diagram depiction 30 of an application subsystem 31 and a security subsystem 32 which transitions to a "fail operational" mode 38 upon detecting one or more failure events 34, 36. At the application subsystem 31, an application may be executing in a normal mode of operation 33 until a failure event is detected 34, such as an interrupt request, watchdog event, service request through an interface (e.g., bus, memory, register, etc.), system status change (e.g., power-on or standby event), peripheral event report (e.g., from a built-in self-test unit), safety-related event (e.g., an undervoltage, overvoltage, temperature, error conditions reported from peripherals or application processors), security-related event (e.g., a security sensor event, a clock glitch, a voltage spike, an intrusion event), or the like. Similarly, the security subsystem 32 may include an application that is executing in a normal mode of operation 35 until a failure event is detected 36 and reported. In response to a report of a detected failure event, a policy governor 37 within the security subsystem 32 functions to adjust a security policy and/or restrict a security service on request or when a security related event occurs. As disclosed herein, the policy governor 37 may be a software and/or hardware-based implementation that resides within the context of the security subsystem 32, and that reacts to requests coming from users of the security subsystem 32 and events triggered by sources internal and external to the SoC. In response to the requests or detected failure events 34, 36, the policy governor 37 is configured to restrict security services and/or enforce security policies based on its configuration. For example, the policy governor 37 may be configured to improve security by dynamically and securely adjusting (downscale) security policies during system runtime (e.g., as part of a software boot or hardware initialization process), thereby enabling security policing that is coherent with the system state and adjusted to assumptions on the (in)security of running software at any given time.

In addition to improving security by dynamically adjusting security policies, the policy governor 37 may be configured to help resolve conflicts between security and safety by enabling the definition of a degraded state in which an application subsystem 31 may continue to operate in a fail-operational mode 38 while protecting security assets adequately. In addition or in the alternative, the policy governor 37 may be configured to define runtime sanctions in response to detected failure events that specify which actions can be performed by an application subsystem 31. The policy governor 37 may also store attributes with security assets (e.g., cryptographic keys) that describe usage restrictions and usage conditions associated with the security asset. In addition, the policy governor may specify policies for handling system events, such as reset, interrupts, failure events, etc. Implemented with hardware and/or software, the policy governor 37 is configured to enforce these policies on the security subsystem 32 and/or any other SoC subsystem using one or more interfaces to interact with applications executing on the application processor(s) and otherwise control the system. For example, the policy governor 37 may include system control interfaces that may be used to reset selected application subsystem 31 (e.g., application processors) or the entire SoC. In addition, the policy governor 37 may include system control interfaces to peripherals that configure, reset, enable and disable the peripheral(s).

As disclosed herein, the degraded state security mode may be used during and/or after system standby. After standby, an application subsystem 31 may continue to perform essential tasks in a degraded state when executing a fail-operational mode 38. Depending on the functionality of the application subsystem 31, the execution of a fail-operational mode 38 may eliminate the need to perform a system reset and/or a full secure boot process which consumes both time and energy. And after leaving a standby mode, the application subsystem 31 may use the fail-operational mode 38 to perform routine operations or respond to external requests faster. If deemed necessary, the degraded application may decide to reboot the system to perform secure boot 20 and resume normal operations.

As disclosed herein, a security subsystem may be configured to respond to a service request with a dynamically adjustable security policies 15 which are implemented with a policy governor 16 to respond to service requests from an external application (e.g., through the application interface 4). To provide additional details for an improved understanding of selected embodiments of the present disclosure, reference is now made to FIG. 4 which depicts a simplified block diagram depiction of a data processing system 40 having an application core 41 and security subsystem 42 which handles a service request during normal operation. In this example, the application core 41 loads and executes the application 43, such as by storing an application image in memory as an executable stream of bytes before being executed by the application CPU subsystem it is associated with. In addition, the security subsystem 42 includes one or more security services 44 which interface with the policy governor 45 to provide access to protected assets 47 (e.g., cryptographic keys) based on one or more defined security policies 46. As described more fully below, communications with applications 43 residing on an external application processor or core 41 is handled at the security service 44 through processing service requests (1-REQ) to generate service responses (6-RSP).

Figure 4:
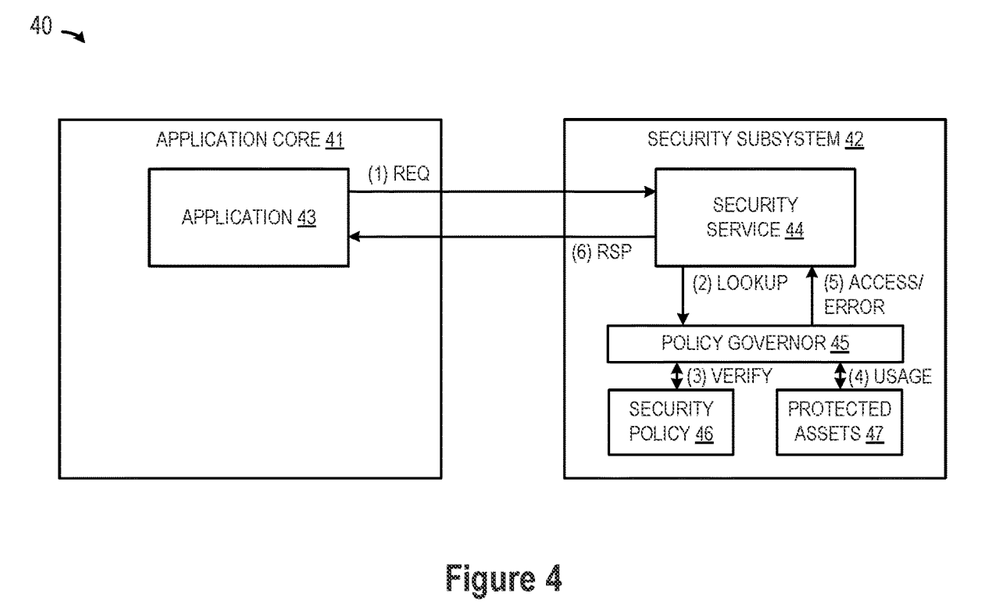
FIG. 4 depicts a simplified block diagram depiction of a policy governor which handles a service request during normal operation in accordance with selected embodiments of the present disclosure.

As a first step for handling service requests, the application 43 creates and transmits a service request (1-REQ) towards a security service 44 provided by the security subsystem 42. In a service request, the application 43 may reference the type of service requested and provide a reference to the asset(s) to be used with the service, such as a protected asset 47. In response to the service request, the security service implementation 44 requests a policy lookup (2-LOOKUP) through the policy governor 45. Accessing the security policy 46, the policy governor 45 verifies the service request (3-VERIFY) to determine if the service request is permitted. If the service request is permitted by the applicable security policy 46, the policy governor 45 grants usage of the protected asset 47 (4-USAGE), and access to the protected asset 47 is provided to the security service 44 (5-ACCESS). However, if the service request is declined by the applicable security policy 46, the policy governor 45 signals an error condition to the security service 44 (5-ERROR). In response, the security service 44 provides a service response (6-RSP) to the application 43. In selected embodiments, the service response may include a status report, such as an error condition, or a reference for future use. In addition or in the alternative, the service response may include a reference to the service request and its results. In selected embodiments, the service response may include the result of the service request.

In other embodiments disclosed herein, a security subsystem may be configured to dynamically adjust system security policies at a policy governor which responds to policy downgrade requests to adjust the system's security policy according to rules defined in its configuration. The policy governor may adjust the security policy to restrict or downgrade usage of services and security related assets in whole or in part. To provide additional details for an improved understanding of selected embodiments of the present disclosure, reference is now made to FIG. 5 which depicts a simplified block diagram depiction of a data processing system 50 having an application core 51 and security subsystem 52 which handles a policy downgrade request (1-PDR) initiated by the application 53. In this example, the application core 51 loads and executes the application 53, such as by storing an application image in memory as an executable stream of bytes before being executed by the application CPU subsystem it is associated with. In addition, the security subsystem 52 includes one or more security services 54 which interface with the policy governor 55 to provide access to security assets 57 (e.g., cryptographic keys) based on one or more defined security policies 56. As described more fully below, communications with applications 53 residing on an external application processor or core 51 is handled at the security service 54 through processing policy downgrade requests to generate status responses.

Figure 5:
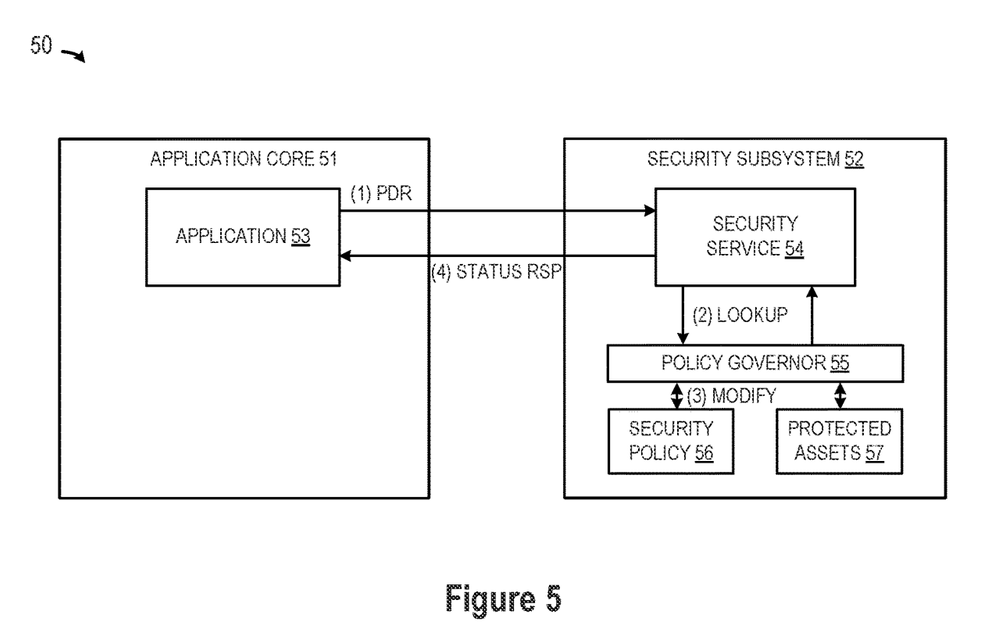
FIG. 5 depicts a simplified block diagram depiction of a policy governor which implements a security policy downgrade initiated by an application in accordance with selected embodiments of the present disclosure.

As a first step for handling policy downgrade requests, the application 53 creates and transmits a policy downgrade request (1-PDR) towards a security service 54 and/or policy governor 55 provided by the security subsystem 52. For example, selective restrictions in a security policy 56 may be applied in case a usage restriction is demanded as part of a service request generated by the application 53. In such a policy downgrade service request, one or more protected services 54 or assets 57 are referenced and the new usage options are supplied. In selected embodiments, an application 53 may only request to apply further restrictions on the referenced service 54 or asset 57. This generally means, that new usage options supplied by the application 53 must not include options that are exceeding options of the present security policy at the time of request. In response to the policy downgrade service request, the security service implementation 54 requests a policy lookup (2-LOOKUP) through the policy governor 55. Accessing the security policy 56, the policy governor 55 verifies the request and changes the corresponding security policy (3-MODIFY). Based on the results of the security policy modification, the security service 54 provides a status response (4-STATUS RSP) to the application 53 which may include a status report, a reference to the policy downgrade service request and its results, and/or the results of the policy downgrade service request.

In accordance with selected embodiments of the present disclosure, the security subsystem 52 may apply one or more automated (pre-configured) restrictions in response to predetermined security-related events. For example, the policy governor 55 may be configured to define actions to take and sanctions to apply upon detecting predetermined security-related events. In addition to applying common sanctions (e.g., system reset, an interrupt or denial of access to security services), the policy governor may be configured to apply sanctions with selective restrictions, such as allowing the device to operate in a degraded mode (e.g., with limited access to cryptographic keys or device resources).

In an example application of the present disclosure, the bootload mechanism for securely accessing the system security policy may be used in a standard boot flow process for verifying and executing an application. To provide additional details for an improved understanding of selected embodiments of the present disclosure, reference is now made to FIG. 6 which depicts a simplified flow chart showing the logic for an example boot process 60 using multiple software stages 61-65 to verify and execute an application. As will be appreciated, the boot process flow 60 may be executing software on an application processor in multiple stages that are executed sequentially. A first stage may, for example, be a bootloader which is protected by a secure boot, and a second stage may be an application which is verified and executed by the bootloader. At a first step 61, the hardware security subsystem is initialized during the boot of a data processing system that occurs at power-on or during a reset type of event and that may include self-testing. In selected embodiments, the hardware security subsystem is the first and only subsystem to start after system reset which uses startup code to initialize the hardware security subsystem and run the startup flow. As a second step 62, the bootloader may be verified with a secure boot procedure. In selected embodiments of the secure startup flow, the bootloader verification at step 62 occurs after the security subsystem startup code has completed the necessary initialization sequence, at which point execution is transferred to the HSE firmware where select CPU subsystems from the application domain are conditionally released from reset. After successful verification of the bootloader, the bootloader firmware is executed on the application processor at step 63. At step 64, the bootloader applies any applicable/requested access policy restrictions to the security assets. In selected embodiments of the present disclosure, such restrictions may be applied on assets that are not needed after bootloader firmware execution 63. An example restriction that may be applied at step 64 is to remove permissions for an application to encrypt and/or sign data using a cryptographic key that is used to encrypt the application firmware. Such restriction effectively mitigates adversarial actions from the application domain that aim at generating valid firmware images for the target system. In an alternate flow, the access policy restriction step 64 may be skipped, leaving the application with the same level of access that is available to the bootloader application. However, in this case, the application may make use of an encryption service provided by the security subsystem to update he application firmware. At step 65, a firmware application can be verified and executed by the bootloader which may be operating with restricted access rights.

Figure 9:
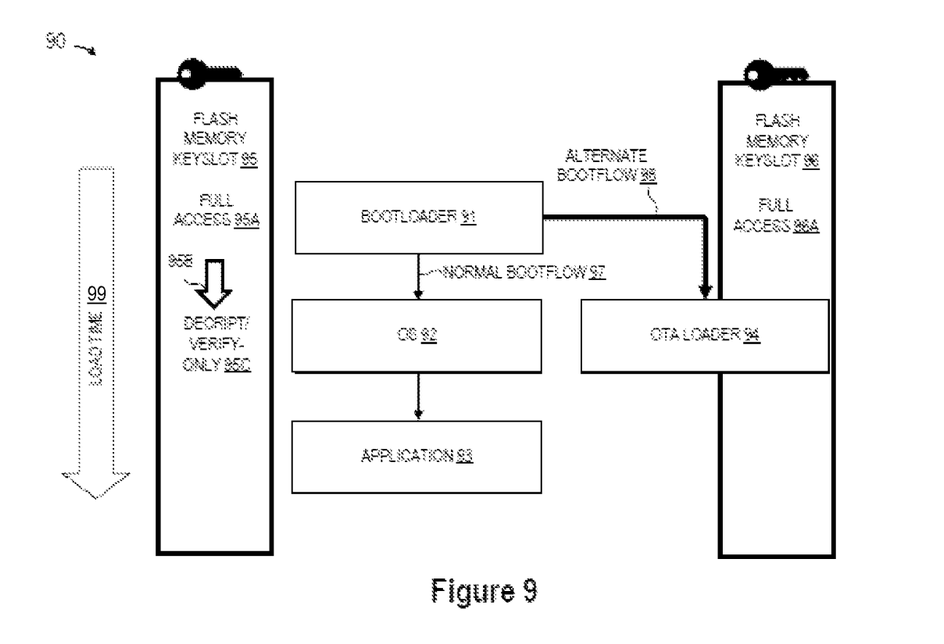
FIG. 9 depicts an example application of an over the air update where the bootloader downscales access to flash decryption key to protect the integrity of the operating system flash memory in accordance with selected embodiments of the present disclosure.

In a related example application of the present disclosure for dynamically adjusting the security policies, a bootload mechanism may securely access the system security policies to perform an over-the-air (OTA) update. To provide additional details for an improved understanding this OTA update application, reference is now made to FIG. 9 which depicts a system 90 having a plurality of stages, including a boot loader 91, operating system (OS) 92, application 93, and an OTA bootloader 94 for providing an OTA update where the bootloader downscales access to flash decryption key to protect the integrity of the operating system flash memory. As disclosed with reference to the load time sequence 99, the bootloader 91 may execute a normal bootflow 97 to verify the OS 92, which in turn verifies the application 93. To protect the integrity of the OS (flash), the bootloader 91 access to the OS flash memory decryption keyslot 95 starts with "full access" 95A, but is downscaled 95B to "decrypt and verify only" 95C in the normal flow. From this point in time and until a following system reset, further use the flash memory keyslot 95 through services other than encryption and verification services is prohibited in the security policy 56. However, for OTA updates, the bootloader 91 may execute an alternate bootflow 98 to allow the OTA bootloader 94 to rewrite the OS's flash memory, in which case the bootloader 91 access to the OS flash memory decryption keyslot 96 is maintained at "full access" 96A. The OTA bootloader 94 may make use of an encryption service of the security subsystem to encrypt the OS flash memory with a key stored in flash memory keyslot 96.

Figure 6:
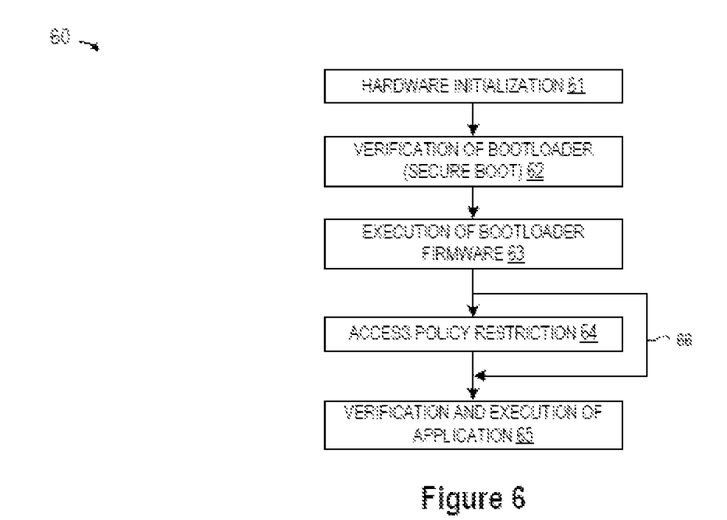
FIG. 6 depicts a simplified flow chart showing the logic for an example boot process using multiple software stages in accordance with selected embodiments of the present disclosure.

In another example application of the present disclosure, the bootload mechanism for securely accessing the system security policy may be used in an alternative boot flow process for verifying and executing an application software update. The alternative boot flow process is similar to boot process 60, except there is no access policy restriction step, as indicated by the bypass path 66. Instead of applying an access policy restriction, a different update application is executed at step 65. In this example where there is no access restriction step, the update application is provided with the same level of access that is available to the bootloader application. In other embodiments, the update application may have a level of access similar to the normal application, or a level of access distinct from the level of access of the normal application. In this case, the update application may make use of an encryption service provided by the security subsystem. The encryption service may then be used to update the application firmware.

In another example application of the present disclosure for dynamically adjusting the security policies, a bootload mechanism may make use of a service provided by the security subsystem to sign a boot confirmation message that can help a remote entity to confirm that a given system has initialized properly and in an authentic manner. To provide additional details for an improved understanding of this application, reference is now made to FIG. 7 which depicts a system 70 having a monotonic counter K (not shown) and a plurality of stages, including a boot loader 71, operating system (OS) 72, and application 73, for creating a boot confirmation message 78 that is signed using cryptographic keys stored in a specific keyslots 74, 75. As disclosed with reference to the load time sequence 79, the bootloader 71 first verifies the OS 72 and then signs a proof message 76 to indicate successful and authentic boot including sequence number #K generated by the monotonic counter. Signature 76 is generated using key $K_{BL}$ stored in keyslot 74 through a signing service provided by the security subsystem. In similar fashion, the OS 72 verifies the application 73, and then signs the proof message BOOT #K generated by the monotonic counter using the OS signing key ($K_{OS}$) stored in the corresponding keyslot 75, thereby generating a second signed proof message 77 (e.g., SIGN($K_{OS}$, BOOT #K)). Finally, the executed application 73 may create and send a boot confirmation message 78 as a diagnostics message which combines the first and second signed proof messages SIGN($K_{BL}$, BOOT #K), SIGN($K_{OS}$, BOOT #K). As will be appreciated, in order to sign the first proof message 76, the bootloader 71 is entitled to make use of a signing service provided by the security subsystem to generate a signature using the bootload signing key ($K_{BL}$) that is stored in the bootload sign keyslot 74, as indicated by the "Full Access" status 74A for the BL Sign keyslot 74. In similar fashion, the bootloader 71 is entitled to make use of a signing service provided by the security subsystem to generate a signature using the OS signing key ($K_{OS}$) that is stored in the OS sign keyslot 75, as indicated by the "Full Access" status 75A.

Figure 7:
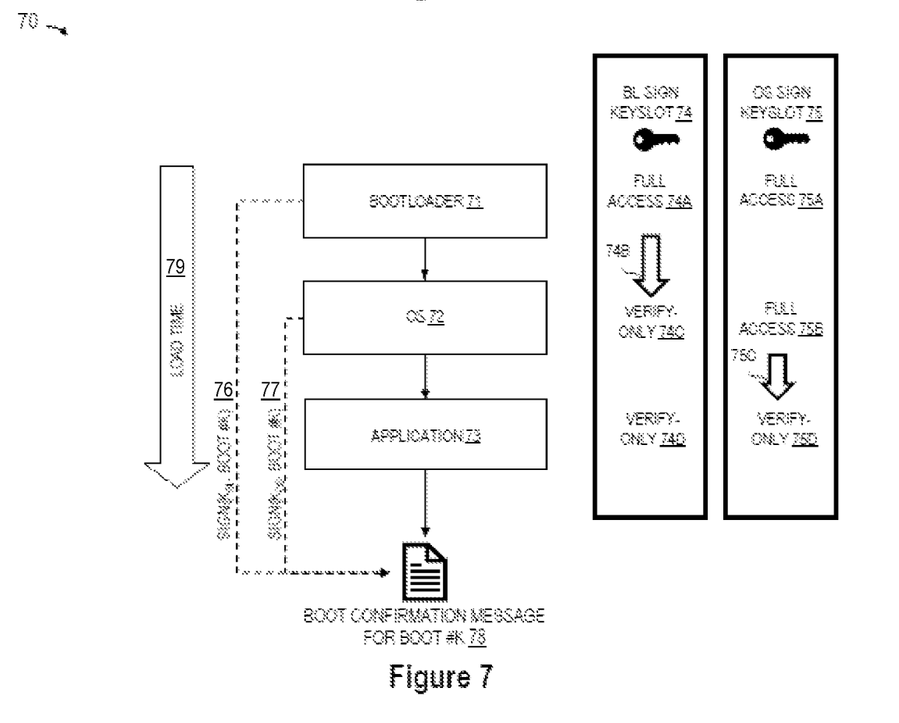
FIG. 7 depicts a system having a monotonic counter and a plurality of stages for creating a boot confirmation message that is signed using two distinct keys stored in two distinct key slots in accordance with selected embodiments of the present disclosure.

To ensure that only an authentic bootloader and operating system software may create such a boot confirmation messages 76, 77, 78, the system 70 may be configured to prohibit further use of the signing keys 74, 75 after generating the signed proof messages 76, 77 through an access policy restriction that changes access privileges from "full access" to a more limited access, such as "verify-only" access. To enable this restricted access, the security subsystem is configured to handle access policy change requests, such as by processing policy downgrade requests described hereinabove. For example, before the bootloader 71 hands execution to the OS 72, permissions to the bootload sign keyslot 74 are reduced 74B to disable use of the bootload signing key ($K_{BL}$) for signature generation and to only allow for usage of the bootload signing key ($K_{BL}$) for verification purposes during further system operation, as indicated by the "Verify-Only" status 74C, 74C. In similar fashion, once the OS 72 verifies the application by using full access 75A, 75B to the OS sign keyslot 75, permissions are reduced 75C to disable use of the OS signing key ($K_{OS}$) for signature generation and to only allow for usage of the bootload signing key ($K_{BL}$) for verification purposes during further system operation, as indicated by the "Verify-Only" status 75D. In an alternate embodiment, the access restrictions 74B, 75B may be automatically applied on keys stored in 74, 75 as part of a one-time usage restriction defined by a security policy. Stated more generally, the system 70 may gradually restrict usage of the keyslots 74, 75 over time, such as by having the bootloader 71 flag the BL sign keyslot 74 as disabled for the rest of system runtime, and by having the OS 72 flag the OS sign keyslot 75 as "verify only" after verifying the application 73. By providing for separate keystore regions 74, 75, the security subsystem enables different privileges to be provided to multiple users, thereby adding granularity in the time domain.

Figure 8:
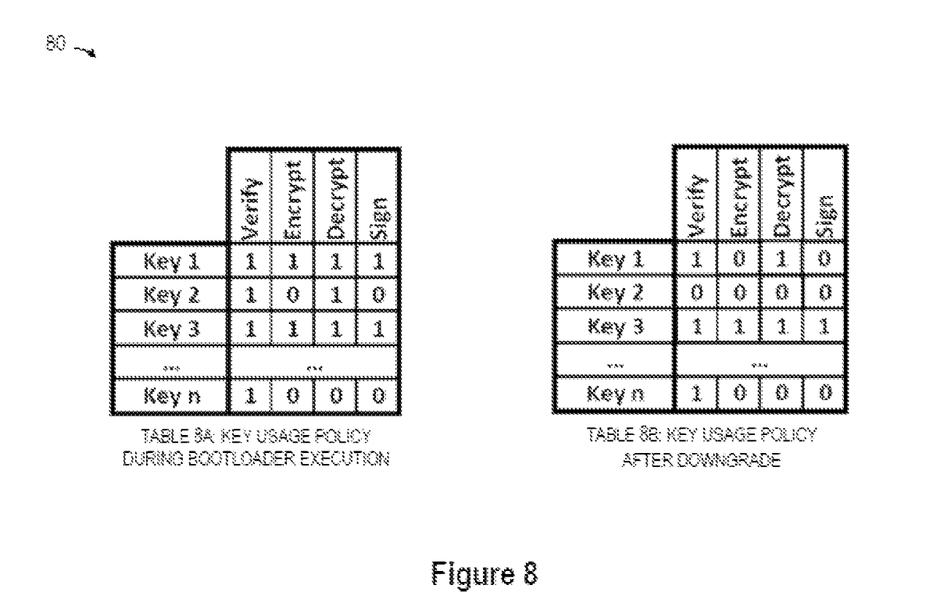
FIG. 8 depicts an example key usage policy table before and after the access policy restriction in accordance with selected embodiments of the present disclosure.

To implement key access policy restrictions, selected embodiments of the present disclosure may use a security policy lookup table to configure and store policy access limitations for a plurality of different protected assets or keys. To provide additional details for an improved understanding of selected embodiments of the security policy lookup table, reference is now made to FIG. 8 which depicts an example key usage policy table before (Table 8A) and after (Table 8B) the access policy restriction. In the first security policy lookup table 8A, the configured access policy is granting full usage access on Key 1 (e.g., Verify=1, Encrypt=1, Decrypt=1, and Sign=1), but only verification and decryption usage access for Key 2 (e.g., Verify=1, Encrypt=0, Decrypt=1, and Sign=0). This example access policy for Key 1 corresponds to the example application illustrated in FIG. 7 where the bootloader 71 has full access to Key 1 to perform a signing operation using a singing service and Key 1. However, the second security policy lookup table 8B reflects the configured access policy after a policy downgrade request is made for Key 1 to provide only verification and decryption usage access for Key 1 (e.g., Verify=1, Encrypt=0, Decrypt=1, and Sign=0) and to remove access on Key 2 (e.g., Verify=0, Encrypt=0, Decrypt=0, and Sign=0), which may represent a key not required for further use after bootloader 71 execution. Continuing with the example of FIG. 7, the downgraded access policy is made before handing execution to the application when the bootloader 71 creates a policy adjustment request resulting in a changed policy shown in Table 8B. As a result of the policy downgrade, the application 73 is limited during further system runtime to only using Key 1 for verification and decryption, but may no longer use it with an encryption or signing service. In addition, after the policy change, Key 2 may no longer be used with any of the services provided by the security subsystem.

In another example application of the present disclosure for dynamically adjusting the security policies, a bootload mechanism may securely access the system security policies to perform an over-the-air (OTA) update. To provide additional details for an improved understanding this OTA update application, reference is now made to FIG. 9 which depicts a system 90 having a plurality of stages, including a boot loader 91, operating system (OS) 92, application 93, and an OTA bootloader 94 for providing an OTA update where the bootloader 91 downscales access to flash decryption key to protect the integrity of the operating system flash memory. As disclosed with reference to the load time sequence 99, the bootloader 91 may execute a normal bootflow 97 to verify the OS 92, which in turn verifies the application 93. To protect the integrity of the OS (flash), the bootloader 91 access to the OS flash memory decryption keyslot 95 starts with "full access" 95A in order to generate any required signed proof messages, but is downscaled 95B to "decrypt and verify only" 95C in the normal flow. From this point in time and until a following system reset, further use the flash memory keyslot 95 through services other than encryption and verification services is prohibited in the security policy 56. However, for OTA updates, the bootloader 91 may execute an alternate bootflow 98 to allow the OTA bootloader 94 to rewrite the OS's flash memory, in which case the bootloader 91 access to the OS flash memory decryption keyslot 96 is maintained at "full access". The OTA bootloader 94 may make use of an encryption service of the security subsystem to encrypt the OS flash memory with a key stored in flash memory keyslot 96.

In another example application of the present disclosure for using dynamically adjustable security policies, the security subsystem may be configured with a policy governor which automatically restricts access policies for applications upon any failure event. In such applications, the security subsystem may be configured to balance the competing functions of protecting relevant assets and also meeting safety goals (e.g., continued operation of safety systems, such as brakes or sensor systems) when a failure event is detected. For example, if an event is detected which indicates there is an attack on the data processing system, the application of a "system reset" sanction to the data processing system would potentially conflict with the operational safety goal by taking the data processing system down during the reset period. To address this challenge, the policy governor may be configured to apply one or more intermediate sanctions with selective restrictions in response to predetermined security-related events. For example, in addition to applying common sanctions (e.g., system reset, an interrupt or denial of access to security services), the policy governor may be configured to apply less restrictive sanctions, such as allowing the device to operate in a degraded mode (e.g., with limited access to cryptographic keys or device resources).

In another example application of the present disclosure for using dynamically adjustable security policies, the security subsystem may be configured with a policy governor which enables fast resumption from a system standby mode where SoC subsystems are disabled or running in a power-efficient mode. From a standby mode, the system may resume operations into a normal or degraded mode of operation, and resumption is typically triggered by external or internal event sources, such as timers, interrupts or peripheral devices. In addition, it is common for such systems to periodically wake up from system standby to perform routine tasks such as polling an external sensor. However, there are security challenges with resuming operations from standby. For example, if a SoC system relies on external memories (e.g., flash or RAM), the authenticity of state and firmware data has to be re-confirmed before they may be used. This generally involves re-confirmation through secure boot and authenticity checks of information stored in memories external to the device which requires energy and time to perform such checks. To avoid the challenges associated with standby mode of operation, the security subsystem may configure a policy governor to enter a degraded security state before going into standby mode. By specifying a degraded security state where security services provided by the security subsystem are restricted to prohibit service and asset usage in a way that endangers the application's security, the operation of the SoC may otherwise continue. For example, a degraded security state may specify that the use of cryptographic keys is reduced to only permit access through a verification service, but not allow their using in a signature generation service. Thus, the ability to specify that an application may operate under a degraded security state allows the application to perform routine tasks or respond quicker to external requests. It may then enter standby or, if normal operation is to be resumed, decide to reset the system.

By now it should be appreciated that there has been provided an apparatus, method, program code, and system for securely controlling operations of a data processing system which includes a security subsystem and one more application subsystems. As disclosed, the security subsystem is activated to provide security services according to an adjustable set of system security policies. In selected embodiments, the security subsystem is activated by initializing a hardware security subsystem during bootup of a data processing system to verify a bootloader. Subsequently, the security subsystem receives a security service request from an external application subsystem. In selected embodiments, the security service request is received as a confirmation message that an application image was successfully installed and verified upon executing bootloader firmware. Upon evaluating the security service request against the adjustable set of system security policies, the security subsystem determines if the security service is granted access to a protected asset. In selected embodiments, the security service request is evaluated by accessing a key usage security policy lookup table storing a plurality of configurable access parameters for one or more protected assets comprising cryptographic keys. If the security service is granted access to the protected asset, the security subsystem performs the requested operation using the security service and the protected asset and generates a response to the security service request. In selected embodiments, the security access policy is adjusted by a request from the application subsystem to change one or more of the plurality of configurable access parameters for one or more protected assets comprising cryptographic keys. In such embodiments, the security access policy may be adjusted by restricting access to one or more of the cryptographic keys by the external application subsystem. In an example, access to one or more of the cryptographic keys may be restricted by removing permissions for the external application subsystem to encrypt and sign data using a first cryptographic key while retaining permission for the external application subsystem to verify and decrypt using the first cryptographic key. In another example, access to the cryptographic key(s) may be restricted by removing permissions for the external application subsystem to verify and decrypt data using a first cryptographic key while retaining permission for the external application subsystem to encrypt and sign using the first cryptographic key. In another example, access to the cryptographic key(s) may be restricted by removing permissions for the external application subsystem to verify data using a first cryptographic key. In another example, access to the cryptographic key(s) may be restricted by removing permissions for the external application subsystem to encrypt data using a first cryptographic key. In another example, access to the cryptographic key(s) may be restricted by removing permissions for the external application subsystem to decrypt data using a first cryptographic key. In another example, access to the cryptographic key(s) may be restricted by removing permissions for the external application subsystem to sign data using a first cryptographic key. In other embodiments, the security policy is not always or automatically modified unless a specific request is made or the security policy defines a one-time usage restriction. In other embodiments, the security access policy is adjusted by automatically applying access restrictions to one or more cryptographic keys by the external application subsystem as part of a one-time usage restriction defined by the security access policy.

In another form, there is provided a data processing system and associated method of securely controlling operations thereof. The disclosed data processing system includes an application subsystem coupled to a bus for executing instructions to issue a security service request. The data processing system also includes a security subsystem coupled to the bus to provide a security service in response to the security service request according to an adjustable set of system security policies. As disclosed, the security subsystem includes secure memory for storing security assets which are not directly accessible by the application subsystem. The security subsystem also includes security policy governor control logic configured to evaluate the security service request against an adjustable set of system security policies to determine if the security service request is granted access to a security asset and to generate a response to the security service request using the security asset if the security service request is granted access to the security asset. In selected embodiments, the security policy governor control logic is configured to evaluate the security service request by accessing a key usage security policy lookup table storing a plurality of configurable access parameters for one or more security assets comprising cryptographic keys. In addition, the security policy governor control logic may be configured to adjust a security access policy for the security asset in the adjustable set of system security policies. In such embodiments, the security policy governor control logic may be configured to adjust the security access policy by accessing a key usage security policy lookup table to change one or more configurable access parameters for one or more security assets comprising cryptographic keys.

In yet another form, there is provided a secure boot method for a computer with a plurality of application subsystems and a hardware security subsystem that grants access to the security assets stored in a secure memory pursuant to an adjustable set of system security policies. In the disclosed secure boot method, the hardware security subsystem is initialized during bootup of a data processing system to verify a bootloader. Once initialized, the hardware security subsystem receives a security service request from a first application subsystem. In addition, the hardware security subsystem evaluates the security service request against the adjustable set of system security policies to determine if the security service request is granted access to a security asset. In selected embodiments, the security service request may be evaluated by accessing a key usage security policy lookup table storing a plurality of configurable access parameters for one or more security assets comprising cryptographic keys. If the security service request is granted access to the security asset, the hardware security subsystem generates a response to the security service request using the security asset. In selected embodiments, the secure boot method also adjusts a security access policy for the security asset in the adjustable set of system security policies by accessing a key usage security policy lookup table to change one or more configurable access parameters for one or more security assets comprising cryptographic keys.

Although the described exemplary embodiments disclosed herein focus on a data processing SoC security subsystem which extends key management concepts in security subsystems by adding a mechanism to securely adjust the system security policy to make it coherent with trust and security assumptions typically found in layered software stacks, the present invention is not necessarily limited to the example embodiments illustrated herein and may be applied to any security system that may dynamically specify access privileges to security services and/or protected assets. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

It should also be noted that at least some of the operations for the methods described herein may be implemented in whole or in part with hardware and/or software instructions stored on a computer useable storage medium for execution by a computer. As an example, an embodiment of a computer program product includes a non-transitory, computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the disclosure may be implemented entirely in hardware or in an implementation containing both hardware and software elements. In embodiments which use software, the software may include but is not limited to firmware, resident software, microcode, etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

A system, method, and apparatus are provided for securely controlling operations of a data processing system in which security subsystem is activated to provide security services by responding to a security service request, evaluating the request against an adjustable set of system security policies to determine if the security service request is granted access to a protected asset, by generating a response to the security service request using the protected asset if the security service request is granted access to the protected asset, by adjusting a security access policy for the protected asset in the adjustable set of system security policies, and by sending the response from the security subsystem to the external application subsystem.

What is claimed is:

1. A method for securely controlling operations of a data processing system, comprising:
   activating a hardware security subsystem to provide security services according to an adjustable set of system security policies, comprising initializing, using immutable software, the hardware security subsystem during bootup of the data processing system to verify a bootloader before starting any other subsystem;
   receiving, at the hardware security subsystem, a security service request from an external application subsystem, wherein the security service request includes a confirmation message that an application image was successfully installed and verified upon execution of bootloader firmware, and the security service request is a request for a cryptographic operation to be performed by the hardware security subsystem using a cryptographic key stored in a secure memory that is protected by the hardware security subsystem, where the cryptographic operation is selected from data verification, data encryption, data decryption, performance of a signing operation, data authentication, and creation of a message authentication code;
   evaluating, by the hardware security subsystem, the security service request against the adjustable set of system security policies to determine whether the security service request is granted access to the cryptographic key, where the adjustable set of system security policies includes a key usage security policy indicating a permission to access the cryptographic key to perform the cryptographic operation;

generating, at the hardware security subsystem, a response to the security service request using the cryptographic key in response to the security service request being granted access to the cryptographic key;

after performing the cryptographic operation, adjusting, at the hardware security subsystem, the key usage security policy for the cryptographic key by performing a permission removal process on the key usage security policy to remove the permission for the external application subsystem to access the cryptographic key for the cryptographic operation, wherein the permission removal process is selected from a group consisting of removing a permission for the external application subsystem to verify data using the cryptographic key, removing a permission for the external application subsystem to encrypt data using the cryptographic key, removing a permission for the external application subsystem to decrypt data using the cryptographic key, removing a permission for the external application subsystem to perform a signing operation using the cryptographic key, and removing a permission for the external application subsystem to create a message authentication code using the cryptographic key; and sending the response from the hardware security subsystem to the external application subsystem.

2. The method of claim 1, where multiple key usage security policies for multiple cryptographic keys, including the key usage security policy for the cryptographic key, are stored in a key usage security policy lookup table, and where evaluating the security service request comprises accessing the key usage security policy lookup table, in which are stored a plurality of configurable access parameters for each of the multiple cryptographic keys.

3. The method of claim 2, where adjusting the key usage security policy comprises accessing the key usage security policy lookup table to change one or more of the plurality of configurable access parameters for one or more of the multiple cryptographic keys.

4. The method of claim 1, where adjusting the key usage security policy comprises removing the permission for the external application subsystem to create a message authentication code using the cryptographic key in a symmetric cryptographic scheme while retaining the permission for the external application subsystem to verify data using the cryptographic key.

5. The method of claim 1, where adjusting the key usage security policy comprises removing the permission for the external application subsystem to perform a signing operation using the cryptographic key in a asymmetric cryptographic scheme.

6. The method of claim 1, where adjusting the key usage security policy comprises removing the permission for the external application subsystem to verify data using the cryptographic key and removing the permission for the external application subsystem to decrypt data using the cryptographic key while retaining the permission for the external application subsystem to encrypt data using the cryptographic key and retaining the permission for the external application subsystem to create a message authentication code using the cryptographic key.

7. The method of claim 1, where adjusting the key usage security policy comprises removing the permission for the external application subsystem to verify data using the cryptographic key.

8. The method of claim 1, where adjusting the key usage security policy comprises removing the permission for the external application subsystem to encrypt data using the cryptographic key.

9. The method of claim 1, where adjusting the key usage security policy comprises removing the permission for the external application subsystem to decrypt data using the cryptographic key.

10. The method of claim 1, where adjusting the key usage security policy comprises removing the permission for the external application subsystem to perform a signing operation using the cryptographic key in an asymmetric cryptographic scheme.

11. The method of claim 1, where adjusting the key usage security policy comprises removing the permission for the external application subsystem to create a message authentication code using the cryptographic key in a symmetric cryptographic scheme.

12. A data processing system comprising:

a bus;

an external application subsystem coupled to the bus for executing instructions to issue a security service request, where the security service request is a request for a cryptographic operation to be performed using a cryptographic key of multiple cryptographic keys, where the cryptographic operation is selected from data verification, data encryption, data decryption, performance of a signing operation, data authentication, and creation of a message authentication code; and a hardware security subsystem coupled to the bus to provide the cryptographic operation in response to the security service request according to an adjustable set of system security policies, where the adjustable set of system security policies includes a key usage security policy indicating a permission to access the cryptographic key to perform the cryptographic operation, and wherein the hardware security subsystem is configured, using immutable software, to initialize during bootup of the data processing system to verify a bootloader before starting any other subsystem, where the hardware security subsystem comprises:

a secure memory for storing the cryptographic keys, which are not directly accessible by the external application subsystem, and security policy governor control logic configured to evaluate the security service request against the key usage security policy to determine that the security service request is granted access to the cryptographic key and to generate a response to the security service request using the cryptographic key, wherein the hardware security subsystem is configured to:

receive the security service request from the external application subsystem, wherein the security service request includes a confirmation message that an application image was successfully installed and verified upon execution of bootloader firmware;

evaluate the security service request against the key usage security policy to determine that the security service request is granted access to the cryptographic key;

generate a response to the security service request using the cryptographic key in response to the security service request being granted access to the cryptographic key;

adjust the key usage security policy for the cryptographic key in the adjustable set of system security policies by performing a permission removal process on the key usage security policy to remove the permission for the external application subsystem to access the cryptographic key for the cryptographic operation, wherein the permission removal process is selected from a group consisting of removing a permission for the external application subsystem to verify data using the cryptographic key, removing a permission for the external application subsystem to encrypt data using the cryptographic key, removing a permission for the external application subsystem to decrypt data using the cryptographic key, removing a permission for the external application subsystem to perform a signing operation using the cryptographic key, and removing a permission for the external application subsystem to create a message authentication code using the cryptographic key; and send the response from the hardware security subsystem to the external application subsystem.

13. The data processing system of claim 12, where multiple key usage security policies for multiple cryptographic keys, including the key usage security policy for the cryptographic key, are stored in a key usage security policy lookup table, and where the security policy governor control logic is configured to evaluate the security service request by accessing the key usage security policy lookup table, in which are stored a plurality of configurable access parameters for each of the multiple cryptographic keys.

14. The data processing system of claim 13, where the security policy governor control logic is configured to adjust the key usage security policy by accessing the key usage security policy lookup table to change one or more configurable access parameters for one or more of the multiple cryptographic keys.

15. A secure boot method for a computer with a plurality of application subsystems and a hardware security subsystem that grants access to security assets stored in a secure memory pursuant to an adjustable set of system security policies, the method comprising:

initializing, using immutable software, the hardware security subsystem during bootup of a data processing system to verify a bootloader before starting any other subsystem;

receiving a security service request at the hardware security subsystem from an external application subsystem, wherein the security service request includes a confirmation message that an application image was successfully installed and verified upon execution of bootloader firmware, and the security service request is a request for a cryptographic operation to be performed by the hardware security subsystem using a cryptographic key stored in a secure memory that is protected by the hardware security subsystem, where the cryptographic operation is selected from data verification, data encryption, data decryption, performance of a signing operation, data authentication, and creation of a message authentication code;

evaluating the security service request at the hardware security subsystem against the adjustable set of system security policies to determine that the security service request is granted access to the cryptographic key, where the adjustable set of system security policies includes a key usage security policy indicating a permission to access the cryptographic key to perform the cryptographic operation;

generating a response to the security service request using the cryptographic key in response to the security service request being granted access to the cryptographic key; and after performing the cryptographic operation, adjusting the key usage security policy for the cryptographic key by performing a permission removal process on the key usage security policy to remove the permission for the external application subsystem to access the cryptographic key for the cryptographic operation, wherein the permission removal process is selected from a group consisting of removing a permission for the external application subsystem to verify data using the cryptographic key, removing a permission for the external application subsystem to encrypt data using the cryptographic key, removing a permission for the external application subsystem to decrypt data using the cryptographic key, removing a permission for the external application subsystem to perform a signing operation using the cryptographic key, and removing a permission for the external application subsystem to create a message authentication code using the cryptographic key.

16. The secure boot method of claim 15, where multiple key usage security policies for multiple cryptographic keys, including the key usage security policy for the cryptographic key, are stored in a key usage security policy lookup table, and where evaluating the security service request comprises accessing the key usage security policy lookup table, in which are stored a plurality of configurable access parameters for one or more of the cryptographic keys.

* * * * *